United States Patent
Sandstrom et al.

(10) Patent No.: US 7,962,567 B1
(45) Date of Patent: Jun. 14, 2011

(54) SYSTEMS AND METHODS FOR DISABLING AN ARRAY PORT FOR AN ENTERPRISE

(75) Inventors: Harold M. Sandstrom, Belmont, MA (US); Helen S. Raizen, Jamaica Plain, MA (US); Michael E. Bappe, Loveland, CO (US)

(73) Assignee: EMC Corporation, Hopkinton, MA (US)

( * ) Notice: Subject to any disclaimer, the term of this patent is extended or adjusted under 35 U.S.C. 154(b) by 804 days.

(21) Appl. No.: 11/475,060

(22) Filed: Jun. 27, 2006

(51) Int. Cl.
*G06F 15/16* (2006.01)

(52) U.S. Cl. ........................................ 709/217; 714/770

(58) Field of Classification Search .................. 709/211, 709/217; 714/770
See application file for complete search history.

(56) References Cited

U.S. PATENT DOCUMENTS

| | | | |
|---|---|---|---|
| 7,111,084 B2 | 9/2006 | Tan et al. | |
| 7,260,628 B2 | 8/2007 | Yamamoto et al. | |
| 7,307,948 B2 | 12/2007 | Infante et al. | |
| 7,349,961 B2 | 3/2008 | Yamamoto | |
| 7,370,241 B2 | 5/2008 | Nicholson et al. | |
| 7,376,764 B1 | 5/2008 | Todd | |
| 7,406,039 B2 | 7/2008 | Cherian et al. | |
| 7,409,586 B1 | 8/2008 | Bezbaruah et al. | |
| 7,475,328 B2 * | 1/2009 | Kubota et al. | 714/770 |
| 7,565,570 B2 | 7/2009 | Dohi | |
| 7,617,320 B2 | 11/2009 | Alon et al. | |
| 7,707,151 B1 | 4/2010 | Blumenau et al. | |
| 2002/0080445 A1 | 6/2002 | Falkenstein et al. | |
| 2002/0156888 A1 * | 10/2002 | Lee et al. | 709/224 |
| 2002/0156918 A1 | 10/2002 | Valdevit et al. | |
| 2003/0210416 A1 * | 11/2003 | Lewis et al. | 358/1.13 |
| 2003/0236074 A1 | 12/2003 | Ishii et al. | |
| 2004/0210656 A1 * | 10/2004 | Beck et al. | 709/225 |
| 2004/0260736 A1 * | 12/2004 | Kern et al. | 707/204 |
| 2005/0028028 A1 * | 2/2005 | Jibbe | 714/6 |
| 2005/0144511 A1 * | 6/2005 | Chih | 714/5 |
| 2005/0188126 A1 | 8/2005 | Mashima et al. | |
| 2005/0262562 A1 * | 11/2005 | Gassoway | 726/22 |
| 2006/0034181 A1 * | 2/2006 | Noguchi et al. | 370/242 |
| 2006/0165002 A1 * | 7/2006 | Hicks et al. | 370/248 |
| 2006/0209707 A1 * | 9/2006 | Nakaya et al. | 370/252 |
| 2006/0253526 A1 | 11/2006 | Welch et al. | |
| 2007/0055797 A1 * | 3/2007 | Shimozono | 710/36 |
| 2007/0093124 A1 * | 4/2007 | Varney et al. | 439/499 |
| 2007/0112974 A1 * | 5/2007 | Shirogane et al. | 709/239 |
| 2007/0169186 A1 * | 7/2007 | Ueoka et al. | 726/15 |
| 2007/0234113 A1 | 10/2007 | Komatsu et al. | |
| 2008/0228987 A1 * | 9/2008 | Yagi et al. | 710/316 |

(Continued)

OTHER PUBLICATIONS

Office Action dated Mar. 25, 2010 for U.S. Appl. No. 11/819,611, 18 pages.

(Continued)

*Primary Examiner* — Ajay Bhatia
(74) *Attorney, Agent, or Firm* — Daly, Crowley, Mofford & Durkee, LLP

(57) ABSTRACT

Systems and methods are provided for disabling an array port in an enterprise storage system. In one embodiment, a system comprises a storage area network (SAN), a plurality of hosts, an array controller comprising a plurality of array ports, and a management server. The management server receives a request to disable an identified one of the plurality of array ports and identifies, from a configuration table stored in the management system server, one or more of the plurality of hosts having at least one path to the identified array port. The management server transmits an instruction to the one or more of the plurality of hosts to disable paths to the identified array port.

20 Claims, 3 Drawing Sheets

U.S. PATENT DOCUMENTS

2009/0125754 A1* 5/2009 Chandra et al. ............... 714/7
2009/0210620 A1* 8/2009 Jibbe et al. .................. 711/114
2009/0257361 A1 10/2009 Deshpande et al.

OTHER PUBLICATIONS

Response to Office Action dated Mar. 25, 2010 for U.S. Appl. No. 11/819,611 (response filed Apr. 16, 2010, 14 pages.

Office Action dated Jun. 29, 2010 for U.S. Appl. No. 11/819,611, 17 pages.

RSA Technology Solution Brief: Powerpath® Encryption with RSA: The EMC Solution for Securing Data in Enterprise Storage, 16 pages.

File downloaded for U.S. Appl. No. 11/819,612, filed Jun. 28, 2007, file through Jul. 26, 2010, 154 pages.

http://enterprise.symantec.com, Data Sheet: Storage Management, Veritas CommandCentral™ Storage by Symantec, Centralized Visibility and Control Across Heterogeneous Storage Environments, pp. 1-4.

Sanscreen®, The Enabler for Storage service Management, Jan. 2006.

File downloaded for U.S. Appl. No. 11/819,611, filed Jun. 28, 2007, file through Sep. 29, 2010, 327 pages.

File downloaded for U.S. Appl. No. 11/819,612, filed Jun. 28, 2007, file from Apr. 27, 2010 through Sep. 23, 2010, 363 pages.

File downloaded for U.S. Appl. No. 11/819,609, filed Jun. 28, 2007, file through Sep. 27, 2010, 291 pages.

* cited by examiner

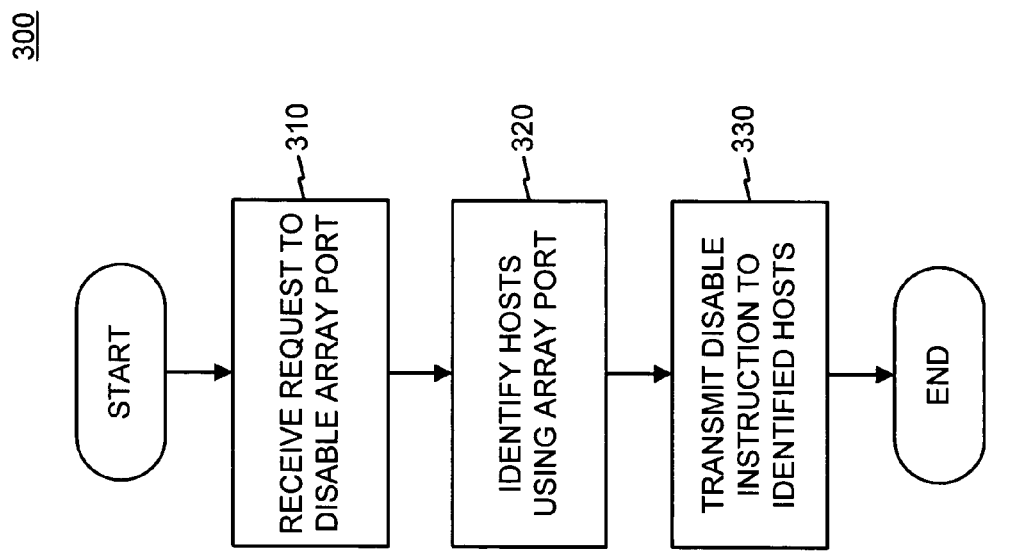

SYSTEMS AND METHODS FOR DISABLING AN ARRAY PORT FOR AN ENTERPRISE

BACKGROUND

I. Technical Field

The present invention generally relates to the field of enterprise path management. More particularly, the invention relates to systems and methods for disabling an array port for an enterprise.

II. Background Information

Enterprise storage systems store data in large-scale environments and differ from consumer storage systems in both the size of the environment and the types of technologies that store and manage the data. A large-scale environment that stores data is typically referred to as a storage area network (SAN). SANs are commonly used in enterprise storage systems to transfer data between computer systems and storage devices. A typical SAN provides a communication infrastructure, including physical connections between devices, and a management layer, which organizes the connections, storage devices, and computer systems.

In a SAN environment, one or more servers provide services to other systems (e.g., clients) over the network. Servers in a SAN environment are typically referred to as hosts. Each host connects to the SAN via one or more host bus adapters. In the case of a Fibre Channel SAN, the hosts may use special Fibre Channel host bus adapters and optical fiber for connections between devices.

An enterprise storage system may include multiple disk drives that combine to form a disk array. A typical disk array includes a disk array controller, a cache, disk enclosures, and a power supply. Examples of disk arrays include the SYMMETRIX Integrated Cache Disk Array System the CLARIION Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into RAID groups for efficient performance. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive.

Disk array controllers connect to a SAN via a port. A port serves as an interface between the disk array controller and other devices in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host) and a "target" (e.g., a disk drive) via a path. For example, a path may include a host bus adapter, an associated SCSI bus or Fibre Channel cabling, and a single port of a disk array controller.

Path management software is frequently used to manage SANs and, among other things, can detect load imbalances for disk array controllers in a SAN and can select alternate paths through which to route data. An example of path management software is EMC POWERPATH by EMC Corporation of Hopkinton, Mass.

When a disk array controller or port of a disk array controller needs maintenance, the disk array controller or port must be taken offline. Taking a disk array controller or port offline will cause input/output errors and path failures across a SAN for any hosts accessing logical units through the offline disk array controller or port. These errors are often difficult to diagnose and may cause unnecessary corrective actions to occur. It is instead preferred to take a disk array controller or port offline with respect to an enterprise before the disk array controller or port is placed in an offline state in the array. However, typical path management software does not provide functionality for disabling array controllers and array ports with respect to an entire enterprise. Therefore, conventional techniques are limited and suffer from one or more drawbacks.

In view of the foregoing, there is a need for improved systems and methods for disabling a port or an array controller.

SUMMARY

Consistent with an embodiment of the present invention, a system is provided for disabling an array port in an enterprise storage system. The system may comprise a storage area network (SAN), a plurality of hosts, an array controller comprising a plurality of array ports, and a management server. The management server may receive a request to disable an identified one of the plurality of array ports. The management server may also identify, from a configuration table stored in the management system server, one or more of the plurality of hosts having at least one path to the identified array port. The management server may transmit an instruction to the one or more of the plurality of hosts to disable paths to the identified array port.

Consistent with another embodiment of the present invention, a computer-implemented method is provided for disabling an array port in an enterprise storage system. A request may be received to disable an identified one of a plurality of array ports included in an array controller connected to a storage area network (SAN). One or more of a plurality of hosts having at least one path to the identified array port may be identified from a configuration table stored in a management server connected to the SAN. A command may be transmitted to the identified one or more of the plurality of hosts to disable paths to the identified array port.

Consistent with another embodiment of the present invention, a computer-readable medium is provided for disabling an array port in an enterprise storage system according to a method. The method may implement the steps discussed above.

Consistent with yet another embodiment of the present invention, an apparatus is provided for disabling an array port in an enterprise storage system. The apparatus may comprise a data storage. The data storage may comprise a notification module for receiving a request to disable an identified one of a plurality of array ports included in an array controller. The data storage may further comprise an identifier module for identifying, from a configuration table stored in the data storage, one or more of a plurality of hosts having at least one path to the identified array port. The data storage may also comprise a transmitter module for transmitting an instruction to the one or more of the plurality of hosts to disable paths to the identified array port.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 3 is a flow diagram of an exemplary method for disabling an array port for an enterprise, consistent with an embodiment of the present invention.

DESCRIPTION OF THE EMBODIMENTS

Figure 1:
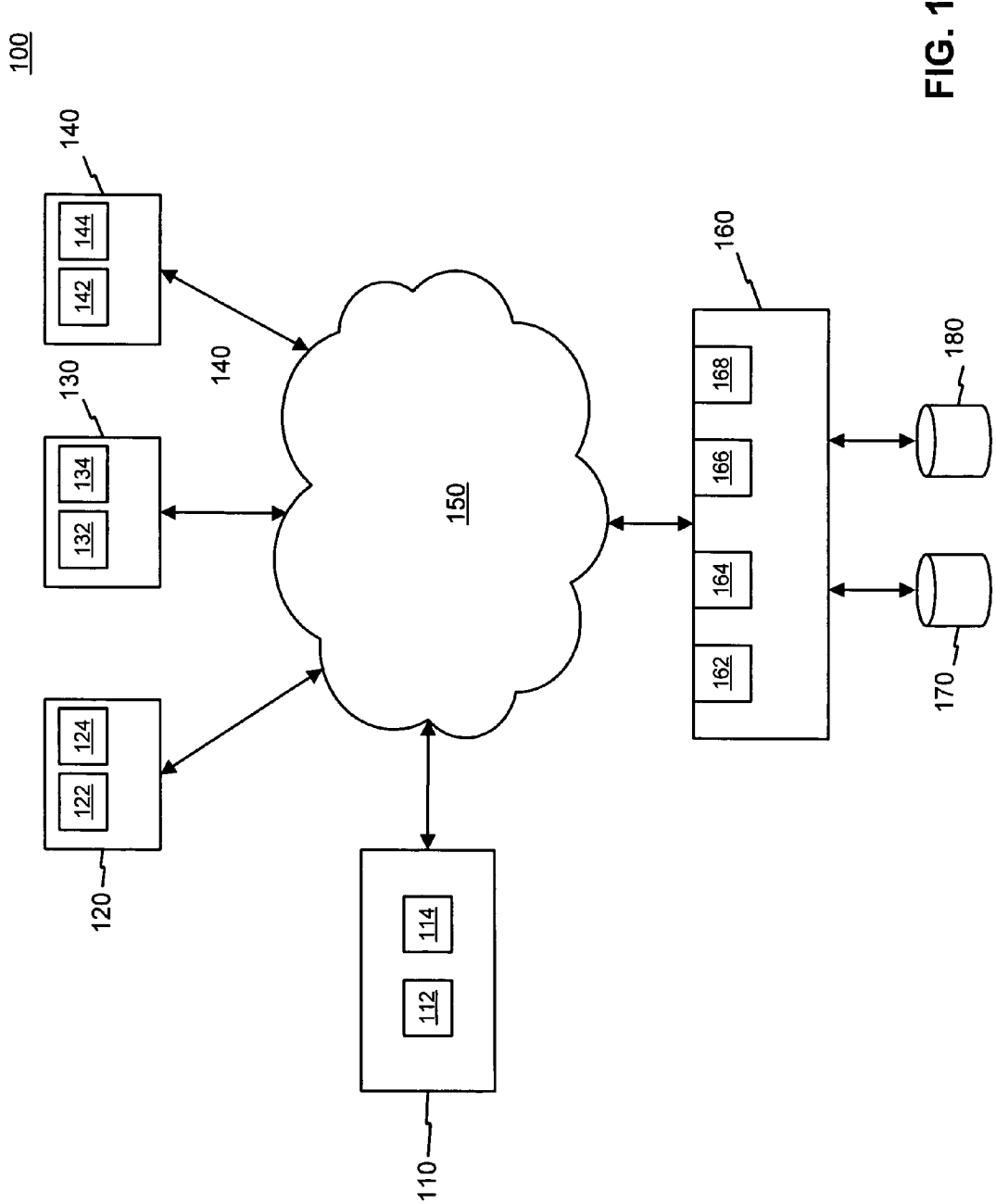
FIG. 1 illustrates an exemplary system for disabling an array port or an array controller for an enterprise, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The methods and apparatus of the present invention are intended for use in storage area networks (SANs) that include data storage systems, such as the SYMMETRIX Integrated Cache Disk Array System or the CLARIION Disk Array System available from EMC Corporation of Hopkinton, Mass. and those provided by vendors other than EMC Corporation.

The methods and apparatus of the present invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

Overview

Systems and methods consistent with the present invention provide functionality for disabling an array port or an array controller for an enterprise. A disable tool may allow an administrator to disable the array port or the array controller for all hosts in the enterprise that have established paths to the disabled array port or array controller. For example, one or more hosts in a SAN may use software (e.g., EMC POWER-PATH by EMC Corporation) for load balancing. Furthermore, the host may communicate with a management server. The management server may use software (e.g., EMC SMARTS by EMC Corporation) to identify and handle errors and to identify path failures from hosts. EMC SMARTS also provides functionality to model components and their relationships across networks, applications, and storage.

An administrator at a host may access the management server via, for example, a graphical user interface (GUI). Furthermore the administrator may transmit a notification to the management server that a particular array port or a particular array controller is no longer available. The management server may then access a configuration table to determine which host or hosts have paths established to the unavailable array port or array controller. The management server may transmit a command to the identified hosts to disable all paths to the unavailable array port or array controller. Furthermore, the management server may transmit a re-enable command to the identified hosts in order to re-enable the disabled array port or array controller.

System Architecture

FIG. 1 illustrates an exemplary system 100 for disabling an array port or an array controller for an enterprise, consistent with an embodiment of the present invention. As shown in system 100, management server 110, hosts 120, 130, and 140, and array controller 160 are connected to SAN 150. One of skill in the art will appreciate that although one management server, three hosts, and one array controller are depicted in FIG. 1, any number of servers, hosts, and array controllers may be provided. Furthermore, one of ordinary skill in the art will recognize that functions provided by one or more components of system 100 may be combined.

Storage area network (SAN) 150 provides communications between the various entities in system 100, such as management server 110, hosts 120-140, and array controller 160. SAN 150 may be a shared, public, or private network and encompasses a wide area or local area. SAN 150 may be implemented through any suitable combination of wired and/or wireless communication networks. Furthermore, SAN 150 may include a local area network (LAN), a wide area network (WAN), an intranet, or the Internet.

Management server 110 may comprise a general purpose computer (e.g., a personal computer, network computer, server, or mainframe computer) having a processor 112 that may be selectively activated or reconfigured by a computer program to perform one or more methods consistent with the present invention. Management server 110 may also be implemented in a distributed network. Alternatively, management server 110 may be specially constructed for carrying-out methods consistent with the present invention. Furthermore, management server 110 may include a data storage 114 for storing a configuration table and program modules that implement a program for disabling an array port or an array controller for an enterprise. Program modules for implementing the program are discussed in further detail with respect to FIG. 2.

Array controller 160 is connected to SAN 150 via ports 162, 164, 166, and 168. Ports 162-168 serve as interfaces between array controller 160 and other devices in SAN 150. Array controller 160 is also connected to disk drives 170 and 180, which may be enclosed in one or more disk enclosures (not shown). Each of disk drives 170 and 180 may be uniquely identified by a LUN. Array controller 160 may communicate with other devices using various protocols, such as the SCSI command protocol over a Fibre Channel link to SAN 150.

Hosts 120-140 may be any type device for communicating with management server 110 over SAN 150. For example, hosts 120-140 may be personal computers, handheld devices, servers, or any other appropriate computing platform or device capable of exchanging data with SAN 150. Hosts 120-140 may each include a processor (i.e., processors 122, 132, and 142) and a data storage (i.e., data storages 124, 134, and 144). Further, each of hosts 120-140 may include one or more host bus adapters (not shown) to connect with SAN 150.

Hosts 120-140 may execute program modules that provide one or more graphical user interfaces (GUIs) for interacting with management server 110. Users may access management server 110 via SAN 150 through a web browser or software application running on, for example, any one of hosts 120-140. For example, a web portal may include options for allowing a user to log onto a secure site provided by management server 110 by supplying credentials, such as a username and a password. Once logged onto the site, the web portal may display a series of screens prompting the user to make various selections for disabling an array port or an array controller. Since embodiments of the present invention may be implemented using an HTTPS (hypertext transfer protocol secure) environment, data transfer occurs in a secure fashion.

Consistent with an aspect of the present invention, a web interface generated by management server 110 that is displayed to users of hosts 120-140 may provide various options. For example, a user may select, using the web interface, a tool for disabling an array port or an array controller. In other embodiments, users of hosts 120-140 may select the disable tool from a GUI generated by software executing on one of hosts 120-140.

Consistent with an embodiment of the present invention, the disable tool is made available to management server 110 by a remote application programming interface (API) executing on any one of hosts 120-140. An API is an interface that an application on a host implements in order to allow other computer programs to request a service. Further, an API allows data to be exchanged between the application and the other computer program. Using one of hosts 120-140, an administrator, for example, may transmit a notification to management server 110 indicating that a particular array port or array controller is unavailable.

Furthermore, management server 110 may use a configuration table stored in data storage 114 to identify hosts that have paths to an array port or an array controller that a user has identified as being unavailable. In particular, a port or controller may be identified by its port or controller number, product identification number, array serial number, and array vendor name. Management server 110 may transmit a command to the identified hosts indicating that paths to the unavailable array port or array controller should be disabled. Furthermore, management server 110 may reverse the process by transmitting a re-enable command to the identified hosts indicating that the paths to the array port or array controller should be re-enabled.

Software Components

Figure 2:
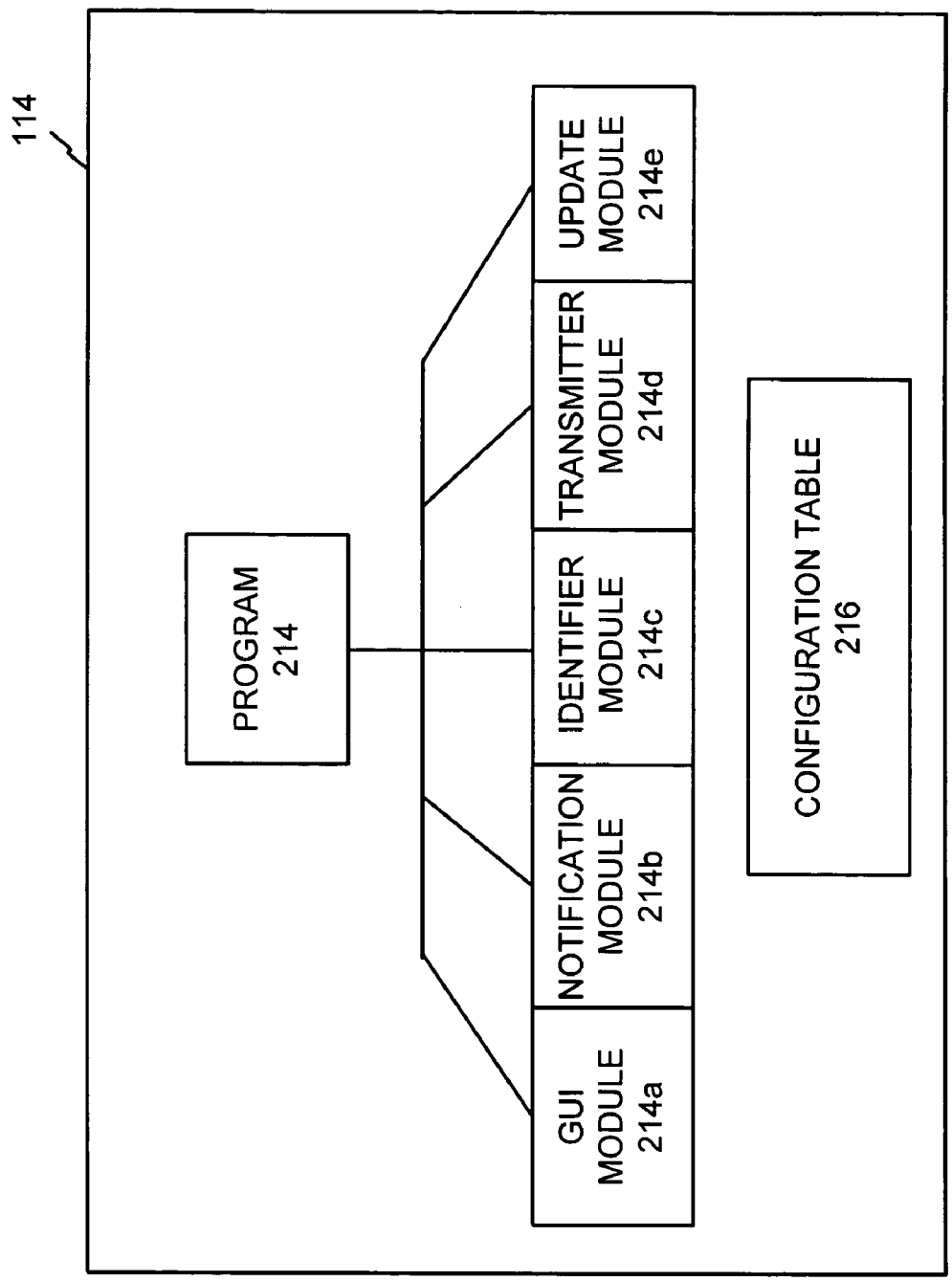
FIG. 2 shows an exemplary software architecture for providing a disable tool for an enterprise, consistent with an embodiment of the present invention.

FIG. 2 shows an exemplary software architecture for providing a disable tool for an enterprise, consistent with an embodiment of the present invention. An administrator may use the disable tool to disable an array port or an array controller in a SAN. The software architecture may be stored in data storage 114, as shown in FIG. 1, for example. In one embodiment, data storage 114 stores instructions of program 214, which when executed, perform the functions of the disable tool. Furthermore, data storage 114 may also store a configuration table 216.

To implement the disable tool, program 214 may include instructions in the form of one or more software modules 214a-214e. Software modules 214a-214e may be written using any known programming language, such as C++, XML, etc. As shown in FIG. 2, software modules 214a-214e include GUI module 214a, notification module 214b, identifier module 214c, transmitter module 214d, and update module 214e. Each of modules 214a-214e is discussed below in further detail.

GUI module 214a may provide processing to display data and receive data selections from users of hosts 120-140. For example, GUI module 214a may generate a GUI used by an administrator at one of hosts 120-140 to select one or more ports 162-168 or array controller 160. The GUI may provide drop down lists or check boxes for selecting an array port or an array controller included in SAN 150.

Notification module 214b may receive a user notification that one or more ports or an array controller is unavailable. For example, an administrator at one of hosts 120-140 may send a notification that a particular array port is unavailable. Accordingly, any hosts having a path to the unavailable array port or array controller should be disabled.

Identifier module 214c may identify hosts that have paths to a particular array port or array controller that an administrator identified as being unavailable in the notification. To determine which of hosts 120-140 have one or more paths to an unavailable array port or array controller, identifier module 214c may examine data stored in configuration table 216 included in data storage 114. Configuration table 216 may store status information of hosts in a SAN, such as which hosts have established parts to a particular array port or array controller. For example, configuration table 216 may indicate, for each host, all paths that the host has established and the target array port or target array controller of each path.

Transmitter module 214d may transmit a command to one or more of hosts 120-140 indicating that paths to a particular array port or an array controller should be disabled. An array port or array controller may be identified by its port or controller number, product identification number, array serial number, and array vendor name. The command may include the identification information and indicate that the host should disable all paths to the array port or array controller specified by the identification information. Furthermore, transmitter module 214d may transmit a command to one or more of hosts 120-140 in order to re-enable paths to an array port or array controlled. For example, the command may include the identification information discussed above and may indicate that a particular host or hosts should re-enable all paths to an array port or array controller specified by the identification information.

Update module 214e may save updates of hosts that have established new paths to configuration table 216. For example, update module 214e may receive information indicating new paths that have been established to certain ports and/or certain array controllers. Accordingly, update module 214e may store current host configuration data in configuration table 216 in order to reflect newly established paths.

While the example provided in FIG. 2 shows program modules 214a-214e and configuration table 216 as being resident in data storage 114 of management server 110, one of ordinary skill in the art will appreciate that program modules 214a-214e and/or configuration table 216 may be stored in data storages 124, 134, and 144 of any one of hosts 120, 130, or 140, for example.

Process for Disabling an Array Port for an Enterprise

Referring now to FIG. 3, a flow diagram 300 is provided of an exemplary method for disabling an array port for an enterprise, consistent with an embodiment of the present invention. The method describes a process for disabling an array port based on a configuration table stored by a management server. The configuration table is used to identify one or more hosts having a path to an array port that a user has indicated is unavailable. Accordingly, the management server may transmit a disable command to the hosts having paths to the unavailable array port.

At the start of the process, a user may transmit a notification from one of hosts 120-140 to management server 110. (Step 310). The notification may specify one of ports 162-168 of array controller 160, which has become unavailable. For example, the port may have experienced a failure or an administrator may wish to take the port offline. The notification may identify the port by port number, product identification number, array serial number, and array vendor name. The process then proceeds to step 320.

In step 320, management server 110 may identify which of hosts 120-140 have paths to the port that is unavailable. As part of this step, management server 110 may examine data stored in configuration table 216 that indicates which hosts are connected to which array ports. For example, configuration table 216 may store status information of hosts 120-140, such as the paths from each of hosts 120-140 to ports 162-168.

Next, management server 110 may transmit a command to one or more of hosts 120-140 that were identified in step 220. (Step 330). For example, the command may indicate that paths from the identified hosts to the unavailable array port should be disabled. In order for the host to identify the port, the command may identify the port by port number, product identification number, array serial number, and array vendor name. The one or more hosts having paths to the unavailable array port may then disable appropriate paths. The process then ends.

In other implementations of the above process, in step 310, the notification may specific an array controller, such as array controller 160, which should have all of its ports disabled (i.e., ports 162, 164, 166, and 168). Furthermore, during the above process, when a user specifies that a particular port should be disabled, management server 110 may optionally prompt the user to indicate whether to also disable all ports of the array controller having the specified port. For example, referring again to FIG. 1, a user at host 120 may disable port 162 of array controller 160. Management server 110 may then transmit a notification to host 120 indicating that port 162 is part of array controller 160. Furthermore, the notification may ask the user at host 120 to respond whether the user wishes to disable the entire array controller 160 (i.e., also disable ports 164, 166, and 168). When a user responds affirmatively, in step 330, management server 110 may transmit a command to all hosts having paths to the array controller 160 indicating that ports 162-168 should be disabled. One of ordinary skill in the art will appreciate that these and other modifications to the process are consistent with the spirit and scope of the present invention.

In still other implementations of the present invention, the above process may be reversed through the use of a re-enable command. For example, in step 310, the notification transmitted by a user from one of hosts 120-140 to management server 110 may specify one of ports 162-168 of array controller 160 that should be re-enabled. Further, in step 320, management server 110 may instead identify which of hosts 120-140 previously had paths to the specified port. Accordingly, in step 330, the command transmitted to one or more of the identified hosts 120-140 may indicate that paths from the identified hosts to the unavailable array port should be re-enabled. disabled.

Accordingly, systems and methods consistent with the present invention provide a tool for disabling an array port or an array controller for an enterprise. For example, in one implementation, a system disables an array port in an enterprise storage system. The system comprises a storage area network (SAN), a plurality of hosts, an array controller comprising a plurality of array ports, and a management server. The management server receives a request to disable an identified one of the plurality of array ports and identifies, from a configuration table stored in the management system server, one or more of the plurality of hosts having at least one path to the identified array port. The management server transmits an instruction to the one or more of the plurality of hosts to disable paths to the identified array port. Subsequently, the management server may transmits an instruction to the one or more of the plurality of hosts to re-enable paths to the identified array port.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for disabling an array port in an enterprise storage system, the system comprising:
   a storage area network (SAN);
   a plurality of hosts;
   an array controller comprising a plurality of array controller ports; and
   a management server, the management server receiving a request to disable an identified one of the plurality of array controller ports and identifying, from a configuration table stored in the management server, one or more of the plurality of hosts having at least one path to the identified array controller port, and transmitting an instruction to the one or more of the plurality of hosts to disable paths to the identified array controller port.
   wherein the identified one of the plurality of array controller ports is at least one of a failed array controller port or an array controller port requiring maintenance.

2. The system of claim 1, wherein the management server receives a request to disable more than one array controller port.

3. The system of claim 1, wherein the management server receives a request to disable the plurality of array controller ports of the array controller.

4. The system of claim 1, wherein the instruction includes a port number, a product identification number, an array serial number, and an array vendor name.

5. The system of claim 1, wherein the request is received from a host connected to the SAN.

6. The system of claim 1, wherein the configuration table stores path information for the plurality of hosts.

7. The system of claim 1, wherein the management server receives a request to re-enable the identified one of the plurality of array controller ports.

8. A method for disabling an array controller port in an enterprise storage system, the method comprising:
   receiving a request to disable an identified one of a plurality of array controller ports included in an array controller connected to a storage area network (SAN);
   identifying, from a configuration table stored in a management server connected to the SAN, one or more of a plurality of hosts having at least one path to the identified array controller port; and
   transmitting a command to the identified one or more of the plurality of hosts to disable paths to the identified array controller port.
   wherein the identified one of the plurality of array controller ports is at least one of a failed array controller port or an array controller port requiring maintenance.

9. The method of claim 8, wherein a request is received to disable more than one array controller port.

10. The method of claim 8, wherein a request is received to disable all of plurality of array controller ports of the array controller.

11. The method of claim 8, wherein the command includes a port number, a product identification number, an array serial number, and an array vendor name.

12. The method of claim 8, wherein the request is received from a host connected to the SAN.

13. The method of claim 8, wherein the configuration table stores path information for the plurality of hosts.

14. The method of claim 8, wherein the management server receives a request to re-enable the identified one of the plurality of array controller ports.

15. A computer-readable storage medium comprising programmable instructions adapted to perform a computer-implemented method for disabling an array controller port in an enterprise storage system, the method comprising:
   receiving a request to disable an identified one of a plurality of array controller ports included in an array controller connected to a storage area network (SAN);
   identifying, from a configuration table stored in a management server connected to the SAN, one or more of a plurality of hosts having at least one path to the identified array controller port; and
   transmitting a command to the identified one or more of the plurality of hosts to disable paths to the identified array controller port.
   wherein the identified one of the plurality of array controller ports is at least one of a failed array controller port or an array controller port requiring maintenance.

16. The computer-readable storage medium of claim 15, wherein a request is received to disable more than one array controller port.

17. The computer-readable storage medium of claim 15, wherein a request is received to disable all of the plurality of array controller ports of the array controller.

18. The computer-readable storage medium of claim 15, wherein the command includes a port number, a product identification number, an array serial number, and an array vendor name.

19. The computer-readable storage medium of claim 15, wherein the request is received from a host connected to the SAN.

20. The computer-readable storage medium of claim 15, wherein the configuration table stores path information for the plurality of hosts.

* * * * *